123,732

UNITED STATES PATENT OFFICE.

JOHN J. SCHILLINGER, OF NEW YORK, N. Y.

IMPROVEMENT IN THE MANUFACTURE OF ARTIFICIAL STONE.

Specification forming part of Letters Patent No. 123,732, dated February 13, 1872.

*To all whom it may concern:*

Be it known that I, JOHN J. SCHILLINGER, of the city, county, and State of New York, have invented a new and useful Improvement in the Manufacture of Artificial Stone; and I do hereby declare the following to be a full, clear, and exact description thereof, which will enable those skilled in the art to make and use the same.

This invention relates particularly to the manufacture of artificial stones from hydraulic cement, sand, and water; and it consists in exposing these stones, after they have been molded in a steam-chamber, to a heated humid atmosphere in such a manner that the same, while being baked, are supplied with the necessary quantity of moisture to prevent them from becoming brittle. After the stones have been baked in the steam-chamber I dip them in a solution of silicate of soda, and finally in a heated mixture of oil and beeswax, whereby the stones are rendered hard and proof against moisture, and the alkaline salts are prevented from decomposition.

In carrying out my invention I take hydraulic cement, sand, and water, and mix these ingredients to such a consistency that the mass can be readily pressed in molds to form stones of the required shape. After being removed from the molds the stones have to be left to be hardened, and I have found that unless the stones are supplied with a certain quantity of moisture during the hardening process, they become brittle and of little practical value. After removing them from the molds, therefore, I introduce the same into a chamber supplied with moist steam, thus exposing the stones to a heated humid atmosphere, whereby the same are hardened in a short time, while they are enabled to take up a sufficient quantity of moisture during the hardening process to prevent them from becoming brittle. By these means stones of superior quality can be produced in less time than is required to manufacture similar stones of an inferior quality by the process generally adopted, where the stones are left to harden in the open atmosphere. After the stones are hardened in the steam-chamber, which is generally accomplished in about forty-eight hours, I remove them from said chamber and dip them, first in a solution of silicate of soda, and when dry, I dip them again in a heated mixture of oil and beeswax. By the action of this last-named mixture the pores of the stones are closed, and the stones are rendered proof against moisture; and, furthermore, the alkaline salts contained in the stones are saved from decomposition by the influence of the atmosphere, and thereby the formation of saltpeter on said stones is effectually prevented.

What I claim as new, and desire to secure by Letters Patent, is—

1. The herein-described process of manufacturing artificial stones from hydraulic cement, sand, and water, by exposing the same, after they have been molded, to a heated humid atmosphere, substantially in the manner set forth.

2. Treating the stones after the same have been molded and hardened, first with a solution of silicate of soda, and then with a heated mixture of oil and beeswax, substantially in the manner herein described.

This specification signed by me this 9th day of January, 1872.

JOHN J. SCHILLINGER.

Witnesses:
W. HAUFF,
E. F. KASTENHUBER.